Patented Nov. 10, 1942

2,301,623

UNITED STATES PATENT OFFICE 2,301,623

ACIDIFIED DIATOMACEOUS EARTH FILTER AIDS

Milo A. Harrison, Hermosa Beach, Calif., assignor to The Dicalite Company, Los Angeles, Calif., a corporation of Nevada No Drawing. Application November 12, 1941, Serial No. 418,850

4 Claims. (Cl. 99—48)

The instant application is a division of my copending application entitled "Acidified diatomaceous earth filter-aids," filed April 9, 1938, under Serial No. 201,188.

The invention relates to the treatment of various oils, fats and aqueous liquids with diatomaceous earth filter-aids for the clarification thereof, and to the production of a filter-aid containing free acid which may advantageously be substituted for the conventional filter-aids in certain instances.

An object of the invention is to prevent reversion or darkening of the color of certain liquids following their clarification by the use of diatomaceous earth filter-aids.

An object of the invention is to prevent a change in the pH value of certain liquids which may otherwise follow their clarification by the use of filter-aids.

An object of the invention is to promote and maintain the suspension in certain liquids of diatomaceous earth powders used as fillers or bodying agents.

It is common practice to filter various liquids with the addition of small quantities of finely comminuted diatomaceous earth, for the purpose of removing water cloud, mucilaginous substances, finely divided solid particles and other suspensions which are not removable by filtration without the addition of the filter-aid. In some cases the clarification only of the liquid is accomplished, in others the clarification is accompanied by partial decolorization, which may be due to the removal of dark colored suspensoids or to actual adsorption of coloring matters originally in solution.

Normally, the liquid thus clarified has a color stability at least equal to that of the original liquid, but to this rule there are important exceptions. For instance, cocoanut oil which has been clarified with a diatomaceous earth filter-aid tends to darken rather rapidly after clarification, particularly as to the red constituent of the total color. This effect is more pronounced with the use of calcined earths than when natural or uncalcined earths are used, and is still more pronounced when calcination has been effected with the use of a fluxing agent. The higher temperatures of calcination also appear to increase the tendency toward color reversion, as does the presence of iron (such as the walls of tanks or tank cars) in contact with the clarified oil.

I have discovered that by the addition to the filter-aid, or to the oil into which the filter-aid is introduced, of a minute proportion of a suitable acid, the tendency of the earth to produce color reversion in the clarified oil may completely be overcome and the color of the oil thereby stabilized. I have also discovered that this addition often tends to increase the bleaching power of the earth or to impart bleaching power under conditions where it does not otherwise exist.

As examples of these phenomena I cite the following results taken from a large number of tests directed to determine the extent of the tendency toward color reversion exhibited by cocoanut oils clarified by the use of diatomaceous earth filter-aids, and the dosages of acid necessary to correct this tendency. In making the tests of which the results are recited in the following table, the oil used was the same throughout (crude expeller oil) but in the different groups was either in the unbleached condition or partially or fully bleached by treatment with a well known bleaching clay. Likewise, the earth used as a filter-aid was the same throughout as to its original character but, as noted in the left-hand column of the table, was differently heat treated in different tests. Explaining this legend, the "natural" earth was heated only to substantial dryness, the "semi-calcined" earth was heat treated to about 1200° Fahr., the "calcined" earth was heat treated to about 1800° Fahr. without the use of a fluxing agent, and the "processed" earth was heat treated at about 1800° Fahr. with the use of a fluxing agent (sodium silicate).

In each case the dosage of filter-aid is stated in percents of the weight of oil taken to be clarified, and the dosage of acid in percents of the weight of filter-aid applied. Citric acid only was used in this series of tests. The clarification was performed in the usual manner, by mixing the oil with the filter-aid and filtering. The red constituent of the color, in Lovibond units, was determined in a 1" column, immediately after clarification and after standing for one day and for three days at a temperature of 120° Fahr.

| Filteraid condition | Dosage of filteraid | Dosage of acid | Red constituent | | | No. |
|---|---|---|---|---|---|---|
| | | | Initial | 1 day | 3 days | |
| | Per cent | Per cent | | | | |
| | | Unbleached oil | | | | |
| ......... | None.. | None............ | 6.0 | 6.3 | 6.4 | 1 |
| Natural.. | 5...... | ......do............ | 3.6 | 4.1 | 4.5 | 2 |
| Semicalc.. | 5...... | ......do............ | 4.2 | 4.5 | 5.3 | 3 |
| Calcined.. | 5...... | ......do............ | 5.4 | 6.0 | 7.5 | 4 |
| | | Semibleached oil | | | | |
| ......... | None.. | None............ | 3.1 | 3.3 | 4.0 | 5 |
| Processed. | 5...... | ......do............ | 3.3 | 5.7 | 6.8 | 6 |
| Do.... | 5...... | 0.5............. | 2.3 | 3.7 | 4.3 | 7 |
| Do.... | 5...... | 1.0............. | 2.2 | 2.2 | 2.2 | 8 |
| Do.... | 5...... | 2.0............. | 2.3 | 2.0 | 2.0 | 9 |
| Do.... | 5...... | 4.0............. | 2.2 | 2.2 | 2.0 | 10 |
| | | Bleached oil | | | | |
| ......... | None.. | None............ | 1.0 | 1.0 | 1.3 | 11 |
| Natural.. | 5...... | ......do............ | 0.5 | 0.5 | 1.0 | 12 |
| Semicalc.. | 5...... | ......do............ | 1.5 | 1.6 | 2.7 | 13 |
| Calcined.. | 5...... | ......do............ | 1.8 | 3.3 | 5.5 | 14 |
| Processed. | 5...... | ......do............ | 2.5 | 5.8 | 6.5 | 15 |
| Do.... | 5...... | 0.5............. | 1.7 | 3.8 | 4.7 | 16 |
| Do.... | 5...... | 0.75............ | 1.5 | 1.3 | 1.5 | 17 |
| Do.... | 5...... | 1.0............. | 1.3 | 1.1 | 1.2 | 18 |
| Calcined.. | ½...... | None............ | 1.7 | 3.3 | 3.7 | 19 |
| Do.... | ½...... | 1.0............. | 1.2 | 0.8 | 1.0 | 20 |

In considering the above figures it should be remembered that the filtering value of the filter-aid increased progressively from natural, having the lowest flow rate, to processed, having the highest. In practice only the calcined and the processed earths give sufficient throughput to be commercially useful in this connection and therefore the better results as to color shown by the table as following the use of natural rather than processed earth are not actually realizable.

It should also be stated that while, for purposes of comparison, the same earth was used throughout these tests, the results obtained are not peculiar to this earth but are realized with several other earths from different sources which were experimented with on a less complete scale.

The figures show a slight tendency toward color reversion in the oils themselves, without the addition of filter-aid, this tendency being least in the case of the fully bleached oil (see tests 1, 5 and 11).

The use of either of the filter-aids without acid produces an initial bleach when applied to an unbleached oil (tests 1 to 4) but only the natural earth produces this result when applied to bleached oil (tests 11 and 12). The use of semicalcined, calcined or processed earth on bleached oil produces a progressive initial darkening of the color (tests 11, 13, 14 and 15).

The addition of ½ of 1% of citric acid to the processed filter-aid produces an initial bleach of the semibleached oil whereas this earth without acid gives an initial darkening (tests 5, 6 and 7). Larger doses of acid do not materially increase the initial bleach (tests 7 to 10). The addition of increasing doses of acid, however, progressively reduces the initial darkening due to the use of processed earth on bleached oil (tests 15 to 18).

The addition of ½ of 1% of acid to the processed earth did not overcome the tendency toward reversion of color in either semibleached or bleached oils (tests 7 and 16) but 1% of acid in the earth applied to the semibleached oil and ¾ of 1% in the case of the bleached oil completely overcame this tendency (tests 8 and 17). Larger doses of acid had no further effect (tests 8 to 10 and tests 17 and 18).

These results are wholly surprising and no explanation can be offered as to why the presence of these minute amounts of acid should stabilize the color of the oil nor, for that matter, as to why the filter-aid increases the relatively slight natural tendency of the original oil toward reversion.

The same effect, of color stabilization, is shown to a lesser degree in the clarification of other fatty oils and fats. A few observations of this kind are recorded below. In these tests two samples of each oil or fat were filtered, one with a processed filter-aid without the addition of acid, the other with the addition of a quantity of citric acid equal to $\frac{1}{6}$ of 1% of the weight of the oil. The clarified samples were then maintained at a temperature of 120° Fahr. for three days.

In the table below, the last three columns record the reading of the red constituent of the color on A = the oil prior to clarification;
B = after clarification without acid and after heating for three days;
C = after clarification with acid and after heating for three days.

| | A Original | B Without acid | C With acid |
|---|---|---|---|
| Palm oil....................... | 13.5 | 14.5 | 13.5 |
| Cottonseed oil................. | 15.0 | 16.0 | 13.0 |
| Sesame oil..................... | 0.3 | 0.7 | 0.4 |
| Corn oil....................... | 22.0 | 23.0 | 22.0 |
| Tallow......................... | 3.8 | 4.0 | 3.8 |

The relatively small change from the A to the B column is believed to be, at least in part, due to the fact that the original oils had all been alkali treated and thereby substantially stabilized. A sample of crude oitica oil blackened when filtered without acid and suffered no appreciable color change when filtered with acid.

The beneficial effect of acidification of the earth is also shown in the manipulation of some aqueous liquids, such as whiskey, acid wines and fruit juices.

In the case of whiskey, and particularly after this liquid has been stored in wood barrels, clarification is often required, and it sometimes occurs that the use of diatomaceous earth filter-aids for this purpose causes a serious darkening of the color. This darkening is observed in the filtrate as received and is not properly color reversion, in which a time element is involved.

As an example, a certain whiskey having originally pH 4.2 (Allison potentiometer) was raised to pH 4.5 by clarification with a processed earth of pH 7.5 (in 5% aqueous suspension) and the color was so darkened as to render the liquor unmarketable. When 1% by weight of citric acid was added to the earth, bringing its pH to 3.3, the clarified liquor had its original pH of 4.2 and darkening of color was entirely avoided.

In the clarification of fruit juices and other aqueous liquids containing pectins, the use of a diatomaceous earth filter-aid tends, in some cases, to cause the formation of a cloudy precipitate in the clarified liquid after standing for some time. This tendency is entirely avoided by acidifying the filter-aid to such extent as suffices to maintain in the clarified liquid the same pH value as that of the original liquid, prior to the addition of the filter-aid.

In the above cases, and others of similar character, the pH of the acidified earth is not the governing factor, the criterion being to avoid disturbing the original pH value of the liquid to which the filter-aid is applied. This is accomplished by adding to the earth, or to the liquid, such quantity of acid as to offset that withdrawn by the filter-aid through adsorption or otherwise.

In other cases, however, the pH of the earth as used is the controlling factor, as in its use as a filler or bodying agent is varnishes, lacquers, liquid polishes, rubber compounds, plastics and paper furnishes. In such uses, suspension and dispersion of the earth in the liquid may be produced more rapidly and maintained more readily by bringing the earth to a pH value not exceeding that of the material in which it is to be incorporated, and preferably to exactly the pH value of that material.

As such materials have, almost without exception, a pH lower than that of an unacidified diatomaceous earth, the correction and control of the pH value of the earth is accomplished by the addition of carefully graduated quantities of an acid compatible with the particular compound in which the earth is to be used, this addition of acid being made either to the earth prior to its use or to the material in the conduct of the compounding step.

It has also been noted that the addition of diatomaceous earth as a bodying material to certain resins, or its use for filtering such resins or their constituents or varnishes made from them, may lead to an appreciable discoloration of the liquid. Such depreciation of the color may wholly be avoided by bringing the earth to a pH not exceeding that of the material being treated or bodied, and not exceeding 7.0, by the addition of small amounts of free acid, or by the addition of an equivalent quantity of acid to the material to be treated or being treated.

While all of the experimental results recorded above were obtained with the use of citric acid, other acids may be substituted and the choice of acids is limited mainly by the nature and the use of the liquid to be clarified or the substance to be bodied. For example, in connection with the clarification of oils destined for soap or grease making, and in most bodying operations, it is possible to substitute sulfuric, hydrochloric, phosphoric, acetic or oxalic acid, while for the treatment of edible oils or potable liquids the choice is practically limited to the commercially available fruit acids such as citric and tartaric, tartaric acid being the full equivalent of citric acid in this connection.

So far as I am aware, the method by which the acid is added to the earth is immaterial, so long as it is finely subdivided and intimately dispersed throughout the mass of comminuted earth particles. In practice I prefer to spray a liquid acid or solution into the suction of a fan blower carrying a stream of earth in suspension in an air stream. A finely powdered solid may be introduced in the same manner, or by tumbling or stirring.

While it is convenient and in many ways desirable to introduce the acid into the liquid to be clarified in admixture with the earth, and in the case of bodying agents to add the required quantity of acid to the earth prior to its use, the same results may in most cases be obtained by adding the acid to the liquid to be clarified or the substance to be bodied prior to or during the step of clarifying or compounding. It is not known, nor is it believed, that the acid produces any change in the earth itself, and the invention is believed to lie in the simultaneous presence, in the liquid undergoing treatment, of the diatomaceous earth bodying agent or filter-aid and the quantity of acid required to offset undesired effects of the acid on the liquid.

In some cases the acid may even be added to the clarified liquid after the filter-aid has been removed and a substantial part of the desired effect thereby realized. An example is given in the following comparative tests in which the readings in the three columns are of the red component of the color when freshly filtered (initial), after standing one day and after standing ten days. The yellow component of the color was constant at 35 in all cases. The material tested was the crude cocoanut oil used in preceding tests, the filter-aid was processed and citric acid was used in tests 23 and 34.

|  | Initial | 1 day | 10 days |
|---|---|---|---|
| 21. Crude oil filtered through paper, no filter-aid used | 2.3 | 3.2 | 4.3 |
| 22. Same oil filtered with 5% filter-aid, no acid | 3.1 | 3.8 | 5.7 |
| 23. Same oil filtered with 5% filter-aid containing 2% of its weight of acid | 2.2 | 2.3 | 3.2 |
| 24. Same oil filtered with 5% filter-aid without acid and a quantity of acid equal to that used in test 23 added to filtered oil | 3.2 | 3.4 | 3.8 |

Comparing the results from test 22 with those of test 21 it will be seen that the use of the unacidified filter-aid depreciated the initial color and also led to a greater depreciation of color on standing. Test 23, in which the acid was added to the oil along with the earth, shows an initial color substantially that of the oil to which no earth had been added and materially less darkening of color on standing. The acid not only corrected the depreciation of color caused by the earth to which no acid had been added but also reduced the natural tendency of the oil to darken on standing. Test 24, in which the acid was added to the filtered oil after removal of the filter-aid, shows an initial color substantially that realized in test 22 and thus does not indicate correction of the original depreciation, but the color after standing for ten days is better than that of the crude oil, showing that the tendency of the earth to cause subsequent darkening is corrected (in this case) by the addition of the acid to the filtered oil.

I claim as my invention:

1. In the clarification of an alcoholic beverage the color of which is darkened by contact with diatomaceous earth, the steps of adding to said beverage a diatomaceous earth filter-aid and a quantity of a free acid only sufficient to offset said darkening effect, and thereafter removing from said beverage said filter-aid and substances entrained therein.

2. The method of clarifying an alcoholic beverage the color of which is darkened by contact with diatomaceous earth which comprises: mixing a diatomaceous earth filter-aid with said beverage; filtering said filter-aid from said beverage, and adding to the filtered beverage a quantity of free acid only sufficient to overcome the darkening effect produced by said admixed earth.

3. In the purification of alcoholic beverages the color of which is darkened by contact with diatomaceous earth, the step of adding to said beverage a quantity of a diatomaceous earth filter-aid sufficient for the clarification of said beverage by filtration, together with a quantity of a fruit acid approximately one percent of the weight of said added filter-aid.

4. A method substantially as and for the purpose set forth in claim 1, in which said free acid is citric acid.

MILO A. HARRISON.